United States Patent
Reddy et al.

(10) Patent No.: US 9,705,907 B2
(45) Date of Patent: Jul. 11, 2017

(54) INSPECTED CONTENT DELIVERY WITH PEER-TO-PEER STREAMING

(71) Applicant: Cisco Technology, Inc., San Jose, CA (US)

(72) Inventors: Tirumaleswar Reddy, Bangalore (IN); Daniel Wing, San Jose, CA (US); Prashanth Patil, Bangalore (IN); William Ver Steeg, Buford, GA (US)

(73) Assignee: Cisco Technology, Inc., San Jose, CA (US)

( * ) Notice: Subject to any disclaimer, the term of this patent is extended or adjusted under 35 U.S.C. 154(b) by 191 days.

(21) Appl. No.: 14/613,558

(22) Filed: Feb. 4, 2015

(65) Prior Publication Data

US 2016/0226899 A1 Aug. 4, 2016

(51) Int. Cl.
*G06F 11/00* (2006.01)
*H04L 29/06* (2006.01)
*H04L 29/08* (2006.01)
*H04L 29/12* (2006.01)

(52) U.S. Cl.
CPC ...... *H04L 63/1425* (2013.01); *H04L 61/2514* (2013.01); *H04L 61/2575* (2013.01); *H04L 61/2589* (2013.01); *H04L 63/145* (2013.01); *H04L 67/104* (2013.01); *H04L 67/1063* (2013.01)

(58) Field of Classification Search
CPC ............. H04L 63/1416; H04L 63/1425; H04L 63/145; H04L 61/2514; H04L 61/2575; H04L 63/2589; H04L 67/104; H04L 67/1063; G06F 21/568; G06F 21/564
USPC .......... 726/11, 22–24, 26; 713/188; 709/224
See application file for complete search history.

(56) References Cited

U.S. PATENT DOCUMENTS

| | | | | |
|---|---|---|---|---|
| 7,331,061 B1 * | 2/2008 | Ramsey | ............... | H04L 63/0218 726/11 |
| 7,418,732 B2 * | 8/2008 | Campbell | ............. | G06F 21/562 726/23 |
| 7,930,750 B1 * | 4/2011 | Gauvin | ............... | H04L 63/1416 709/223 |
| 8,056,133 B1 * | 11/2011 | Yao | ........................ | G06F 21/565 726/24 |
| 8,091,134 B2 * | 1/2012 | Benton | ................... | G06F 21/56 709/223 |
| 8,627,457 B2 * | 1/2014 | Wiederin | .............. | G06F 21/567 726/22 |

OTHER PUBLICATIONS

A. Bakker et al., Peer-to-Peer Streaming Peer Protocol (PPSPP), draft-ietf-ppsp-peer-protocol-10, Jun. 17, 2014, 95 pages, Technische Universiteit Delft.
Rui S. Cruz et al., Ppsp Tracker Protocol-Base Protocol (PPSP-TP/1.0), draft-ietf-ppsp-base-tracker-protocol-03, Dec. 31, 2013.
Y. Zhang et al., Problem Statement of P2P Streaming Protocol (PPSP), draft-ietf-ppsp-problem-statement-01, Mar. 28, 2011, 18 pages, IETF-80, Prague.

* cited by examiner

*Primary Examiner* — Hosuk Song (57) ABSTRACT

In one embodiment, A tracker computer receives from a first device in a peer-to-peer network that the first device has content for serving. A content request for the content is received from a second device in the peer-to-peer network. The tracker computer routes the content from the first device to the second device through a server. The content routed through the server is inspected for malicious code.

20 Claims, 3 Drawing Sheets

INSPECTED CONTENT DELIVERY WITH PEER-TO-PEER STREAMING

TECHNICAL FIELD

This disclosure relates in general to the field of computer networks and, more particularly, to inspecting content in peer-to-peer streaming.

BACKGROUND

Streaming traffic is among the largest and fastest growing traffic on the Internet. Peer-to-Peer (P2P) streaming contributes substantially to this growth. The Peer-to-Peer Streaming Peer Protocol (PPSPP) is a protocol for disseminating the same content to a group of interested parties in a streaming fashion. PPSPP supports streaming of both pre-recorded (on-demand) and live audio/video content. In PPSPP, a device having available content attaches to a P2P network, locates a tracker provided by the network, and registers with the tracker to advertise the available content. The device with available content acts as a peer in a Seeder mode to serve content to other peers. However, malicious content (e.g., malware or a virus) could be served by the device. Whether originally obtained from another content provider or added to the content while in the device, the malicious content may or may not be detected by integrity verification schemes for published content. The device enters the P2P network with this content already fetched from another network that did not detect and block the device from fetching the malicious content. As a result, malicious content is served to other peers of the P2P network.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts.

DESCRIPTION OF EXAMPLE EMBODIMENTS

General Overview

Content provided by a peer in P2P is inspected for malicious code. A tracker in the P2P network routes any unchecked content for inspection by a server before the content is provided to other peers. For example, the tracker replaces addresses in the peer list so that content requested by a peer is routed through a TURN server. The TURN sever is co-located with a firewall, or other security device providing security-as-a-service that inspects the content before forwarding to the requesting peer. Inspected content may be tracked, allowing the tracker to route the content from one peer to other peers without the inspection once the content has been shown to be free of malicious code.

In a first aspect, a method is provided. A tracker computer receives from a first device in a peer-to-peer network that the first device has content for serving. A content request for the content is received from a second device in the peer-to-peer network. The tracker computer routes the content from the first device to the second device through a server. The content routed through the server is inspected for malicious code.

In a second aspect, logic is encoded in one or more non-transitory computer-readable media that includes code for execution. When executed by a processor, the code is operable to perform operations including: receiving data from a first peer of a peer-to-peer network, the data addressed to a second peer of the peer-to-peer network; inspecting the data for malicious content; communicating a result of the inspecting to a tracker of the peer-to-peer network; and transmitting the data to the second peer where the malicious content is not found in the data.

In a third aspect, an apparatus includes a memory and a processor. The memory is configured to store a peer list of peers in a peer-to-peer network. The processor is configured to update peer addresses in the peer list for peers of the peer-to-peer network in Seeder mode, the updated peer addresses being for a server, to provide the updated peer addresses to another peer of the peer-to-peer network in a Leecher mode, and to track security inspection on content from the peer operating in the Seeder mode routed through the server.

Example Embodiments

The content provided by a device in P2P may be infected. The content providing device enters a P2P network with this malicious content already fetched from another network that did not detect and block the device from fetching the malicious content. To ensure that malicious content will not be served from this device to other peers in the P2P network, security inspection is provided. The security inspection is a service to the peers or to the entire P2P network.

If content served by a peer using peer-to-peer streaming peer (PPSP) protocol (PPSPP) has not been previously inspected, then a tracker modifies the peer address list to ensure that the content is fetched through a translation (TURN) server co-located with access to a firewall capable of detecting malicious content. Substantially only inspected content may be served to the peers. The firewall is inserted in the path for unscanned content transfer. Subsequent transfers of the scanned content may or may not go through the firewall. When malicious content is found, the publish-subscriber mechanism between the tracker and firewall may be used to block the advertisement of malicious content.

Figure 1:
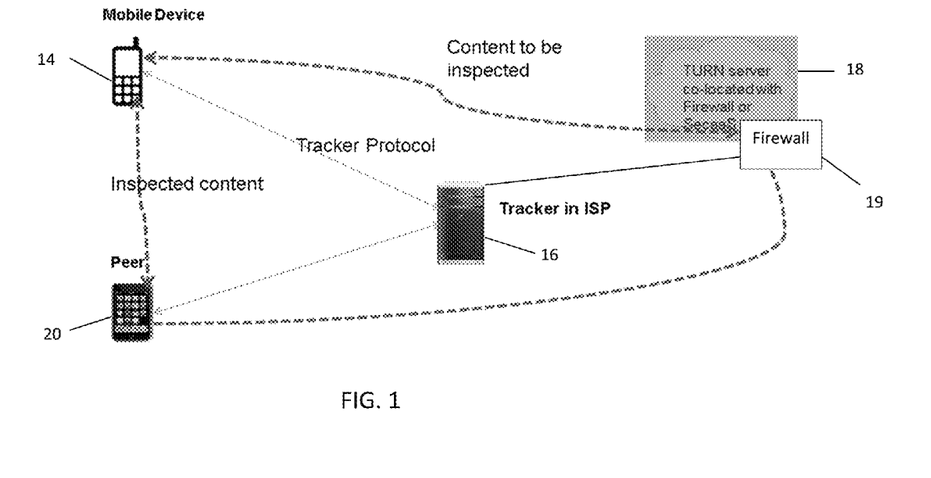
FIG. 1 is a simplified block diagram of an example network for inspected content delivery in P2P streaming.

FIG. 1 shows an example P2P network 10 for inspecting content in P2P streaming. A media session between end-point devices 14, 20 or peers is created. Using PPSP peer protocol, a tracking computer 16 manages the content requests and delivery between the peers 14, 20. A transversal using relay network address TURN server 18 is provided as a proxy for content delivery and inspection routing. A firewall 19 receives the content routed through the TURN server 18 for security inspection.

Any P2P network may be used. Additional, different, or fewer components may be provided in the network, such as additional peers (e.g., end-point devices) connected between each other in any topology. For streaming, the content is provided to one peer 20 or multiple peers 20.

The network is managed by, hosted by, or operated in part by an Internet service provider. For example, the Internet service provider may control or operate one, more, or all of the peers. As another example, the Internet service provider provides the communications network used by the peers 14, 20, the tracking computer 16 and the TURN server 18. The TURN server 18 and/or tracking computer 16 may be provided by third-parties or other source or be provided by the Internet service provider. The network may include additional components, such as routers, other end-point devices, and/or additional firewalls 19.

The network may be an enterprise network, but other networks for P2P sharing of content may be provided. The network is a local area network, wide area network, intranet, virtual local area network, the Internet, or combinations of networks. Any form of network may be provided, such as a transport network, data center, or other wired or wireless network. The network may be applicable across platforms, extensible, and/or adaptive to specific platform and/or technology requirements through link-negotiation of connectivity.

The tracker computer 16 and TURN server 18 may be in the same location, as for example a same room, building, facility or campus. In other embodiments, the tracker computer 16 and the TURN server 18 may be separated or remote from each other, such as being distributed in multiple states and/or countries. The peers 14, 20 are local to each other or distributed throughout a region.

The network devices are connected over links through ports. Any number of ports and links may be used. The ports and links may use the same or different media for communications. Wireless, wired, Ethernet, digital subscriber lines (DSL), telephone lines, T1 lines, T3 lines, satellite, fiber optics, cable and/or other links may be used. Corresponding interfaces are provided as the ports.

Any number of end-point devices 14, 20 may be provided. The end-point devices 14, 20 may be, but are not limited to being, computers, conference servers, tablets, cellular phones, wifi capable devices, laptops, mainframes, voice-over-Internet phones, or other user devices participating in a media session. In the example of FIG. 1, one of the peers (e.g., device 14) is a mobile device, and another of the peers (e.g., device 20) is a tablet computer. The end-point devices 14, 20 connect with wires, such as Ethernet cables, or wirelessly, such as with wifi. The connection between peers may be relatively fixed, such as for personal computers connected by wires to switches. The connection may be temporary, such as associated with mobile devices that access the network as needed or when in range.

The end-point devices 14, 20 are configured to participate in the P2P network. The end-point devices 14, 20 operate pursuant to the P2P protocol, such as Peer-to-Peer Streaming Peer Protocol (PPSPP), or other communications protocol for sharing content. The content may be part of a file, such as part of a video or audio file. Different peers (e.g., end point devices 14, 20) may have the same or different content. Any of the peers may act in a Seeder mode (e.g., as a content source) or Leecher mode (e.g., as a recipient of content form a source) or both.

The tracker computer 16 is a server, router, switch, or other network device for managing the P2P network. A tracker protocol is followed, and includes such actions such as keeping a list of peers, content for each of the peers, and/or address information for the peers. A unified list or separate lists for different information may be used for tracking. The tracker computer 16 communicates with the peers for coordinating sharing of content between the peers. For example, the tracker computer 16 provides an address of a content providing peer to a peer requesting content. The tracker computer 16 may alter the peer list to route content to the TURN server 18. Alternatively, the tracker computer 16 routes a request for content from one peer to the peer having the content.

The TURN server 18 is implemented by one or more servers of the Internet service provider or another provider. The TURN server 18 may be the same or different device as the tracker computer 16. The TURN server 18 participates in P2P by relaying data from a peer or client to any number of other peers. The TURN server 18 allocates an IP address and port to a peer for streaming content to multiple other peers. The content providing peer (e.g., end point device 14) uses the IP address and port of the TURN server 18 to communicate with the other peers. For example the peer with content uses the IP address and port of the TURN server 18 as a media address and port for session description protocol (SDP). Content meant for other peers is encapsulated in a TURN message and sent to the TURN server 18. The TURN packet also contains the destination address of the peer or addresses of the peers. The TURN server 18 converts the packet into a user datagram protocol (UDP) packet and sends the UDP packet on to the peer or peers. The TURN server 18 may also receive UDP packets from the other peer or peers and convert the packet into a TURN message for sending to the content providing peer.

The TURN server 18 implements, is co-located with, or has access to a firewall 19. The firewall 19 may be a server, edge router, or cloud connector. Other network devices may be used inspect content, such as a gateway or bridge. The firewall 19 is a processor device that inspects content for malicious code. The firewall 19 is provided by the Internet service provider or is provided through contract as a security as a service. For example, the instructions associated with inspecting for malicious content are provided, at least in part, by a third party offering security as a service, while the device itself is owned or managed by the Internet service provider. As another example, the TURN server 18 transmits content for inspection to a remote firewall 19 provided as a server for security as a service.

The firewall 19 is configured to inspect content for known malicious code or for types of code not expected in the content. Data routed through the TURN server 18 is inspected for securing the content shared in the P2P network. Data is processed by the firewall 19 for inspection. Deep packet inspection, header inspection, or any now known or later developed check for malicious code may be provided. The firewall 19 permits interactive connectivity establishment (ICE) connectivity checks and subsequent media traffic.

In alternative embodiments, the TURN server 18 is not provided, or a separate server is provided in lieu of the TURN server 18 for inspecting for malicious content. The tracker computer 16 causes the content to be routed to the server, whether a TURN server 18 or a different server, for inspection. The server inspects (i.e., performs the actions of or is the firewall 19) or routes to a separate firewall 19 for inspection. A firewall 19, server, or any other processor may be used for inspecting for malicious content. For example, a firewall 19 is not used, and another device inspects the content.

The various components of the network 10 are configured by hardware and/or software to, in P2P, provide content, inspect content, track, and/or receive content. Logic is encoded in one or more non-transitory computer-readable media for operating the firewall 19, TURN server 18, end-point device 14, end-point device 20, and/or tracker computer 16. The media is a memory. Memories within or outside the network may be used. The logic includes code for execution by a processor or processors, such as processors of the TURN server 18 or firewall 19. When executed by a processor, the code is used to perform operations for providing content for inspection or inspecting content in P2P. The logic code configures the device to perform operations.

The tracker computer 16 and the firewall 19 are configured to interact. In one embodiment, a connection over the network allows the firewall 19 to communicate with the tracker computer 16. The interaction provides inspection results to the tracker computer 16. The tracker computer 16 may use the inspection results to track content. Once the content is determined to be safe, the tracker computer 16 stores the hash or other verification for the content and changes the peer list back to peer addresses serving the content. When future requests for the content are made by another peer, the tracker computer 16 provides the peer addresses serving the content, allowing direct communication between peers as represented in FIG. 1. Alternatively, the tracking computer 16 and firewall 19 do not communicate. For example, any request for content is served through the TURN server 18 for inspection. In other embodiments, the TURN server 18 or other server than the firewall 19 communicates with the tracking computer 16.

Figure 2:
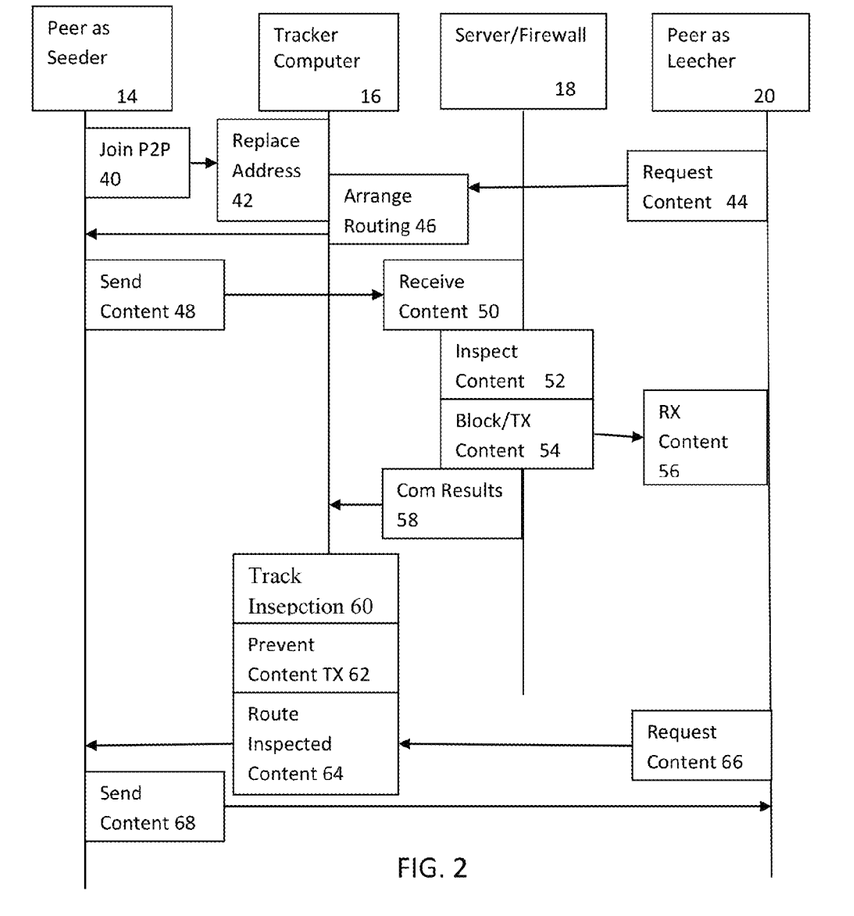
FIG. 2 is a diagram of one embodiment of a method for inspecting content in P2P streaming.

FIG. 2 shows one embodiment of interaction between the end-point device 14, the tracker computer 16, the TURN server 18, and another end-point device 20 in P2P operation. This represents a method for inspecting content in a P2P network. Additional, different, or fewer acts may be provided. For example, other acts for transmitting and receiving requests, acknowledgements, or content are provided. Any now known or later developed P2P or PPSPP operations and communications may be provided. FIG. 2 represents example interactions provided for inspecting the content. As another example, acts 58-68 are not performed, such as where content is always inspected regardless of past inspections.

In FIG. 2, content from one peer, end-point device 14, is provided to another peer, end-point device 20. The same content may be streamed to other end-point devices. Different content from different peers may be provided as well. For example, content on the other peer, end-point device 20, may be provided to the end-point device 14. The inspection of any content is provided regardless of the peer sourcing the content. The inspection is provided for content from any of the peers.

Any content may be shared. In one embodiment, the content is video and audio files for streaming. The content is provided using a real-time protocol (RTP) or other communications for live or recorded streaming. Other content may be used, such as data. Combinations of different types of content may be used.

In FIG. 2, the end-point device 14 with content to be shared joins a P2P network in act 40. In this example, the end-point device 14 is a mobile device. The end-point device 14 communicates with the tracking computer 16 to join the P2P network. The end-point device 14 joins as a peer, such as joining using the PPSP Tracker Protocol.

As part of joining, the end-point device 14 discovers the tracker and announces to the tracker the content that the end-point device 14 has available. The end-point device 14 is to operate in a Seeder mode, at least part of the time. In the Seeder mode, the end-point device 14 is a peer that serves the content to one or more other peers (e.g., end-point device 20). The end-point device 14 advertises a host, server reflexive and relayed candidates and uses Interactive Connectivity Establishment (ICE) to establish P2P connectivity.

In act 42, the tracker computer 16 replaces address information for the content hosting end-point device 14. The replacement is performed for the end-point device 14 or only with respect to particular content for the end-point device 14. If a request for previously inspected content is received, address replacement is not used. If a request for content that has not been previously inspected is received, then address replacement is used regardless of when the replacement occurs. If content advertised by the end-point device 14 (e.g., mobile device acting as a peer) has not been previously inspected by the network, then the tracker computer 16 updates the peer address list or other address storage for the P2P network. Alternatively, the address replacement is performed whether or not the content has been inspected, such as replacing the address for all communications for content in the P2P network for the end-point device 14.

Any address may be replaced in act 42. For example, the host candidate and sever reflexive candidate for the end-point device 14 are replaced with an address or address and port for the TURN server 18. In one embodiment, the tracker computer 16 removes the host candidate and server reflexive candidates announced by the end-point device 14 but retains the relayed candidates. The transport address for the local interface of the end-point device (i.e., the host candidate) and the translated address on the public side of the network address translation (NAT) of the end-point device 14 as obtained from the TURN server 18 (i.e., the server reflexive candidate) are removed. The replacement may be with null values or may be other addresses associated with the TURN server 18 acting as a proxy. The transport addresses are a combination of Internet protocol (IP) address and port for the transport protocol used by the P2P network. Other addresses or addressing schemes may be used.

By keeping the transport address associated with the TURN server 18 (i.e., the relayed candidate), the content to be provided by the end-point device 14 is requested through the TURN server 18. Due to the replacement, the address for the TURN server 18 is communicated by the tracker computer 16 to peers requesting content from the end-point device 14. The communications in the P2P network use the interactive connectivity establishment (ICE) protocol, so the address replacement provides for later routing of content through the TURN server 18 pursuant to ICE instead of routing directly to the end-point device 14 providing the content to the other peer.

In act 44, the end-point device 20 requests content served by the end-point device 14. The end-point device 20 operates in a Leecher mode using the PPSPP to request content advertised as available. The end-point device 20 communicates with the tracker computer 16 to obtain the address for requesting the content.

In act 46, the tracker computer receives the request for content from the end-point device 20. The request is for content hosted by the end-point device 14 to be streamed or provided to the end-point device 20. The PPSP architecture requires peers to communicate with the tracker in order to participate in a particular streaming content swarm. The end-point device 20 communicates with the tracker computer 16 to receive the content. The centralized tracker service is used by PPSP peers for content registration. The request is received as a PPSP peer protocol request for content, but other protocols or formats of the request may be used in the P2P network.

The tracker computer 16 provides the relayed candidate address to the end-point device 20, so that the request is routed to the TURN server 18 for the content from the end-point device 14. Alternatively, the tracker computer 16 forwards the received request to the TURN server 18 using the relayed candidate stored in the peer list for the end-point device 14. In these or another way, the tracker computer 16 arranges for the routing of the content from the end-point device 14 to the end-point device 20 through the TURN server 18.

In act 48, the end-point device 14, in response to the request of act 44, sends the content to the TURN server 18. The content is routed through the TURN server 18 for inspection. The address replacement performed in act 42 ensures that any peer (e.g., in Leecher mode) that requests content that has not been inspected receives the content through the TURN server 18.

In act 50, the TURN server 18 receives the content. The content is served by the end-point device 14. The content is addressed to the TURN server 18 and further addressed to the requesting end-point device 20 in the P2P network The TURN server 18 identifies the content from the source peer. The request for files and chunks are sent over the PPSP Peer Protocol, and those messages are sent through the TURN server 18. Thus, the TURN server 18 has access to those signaling messages. This access is used to identify the files and chunks sent by the peer (e.g., content providing end-point 14). For PPSP Peer Protocol, those signaling messages are the swarm-id from the HANDSHAKE message and the DATA messages. For other protocols or formats, other messaging is used.

The content served by the end-point device 14 may be hashed. The hash is used by the TURN server 18 and/or the receiving peer to verify receipt of the proper content. The tracking computer 16 may record the hash provided by the end-point device 14 or calculate the hash. The tracking computer 16 or the serving end-point device 14 provides the hash for comparison with received content.

In act 52, the content routed through the TURN server 18 is inspected for malicious code. The data is searched for the patterns or sequences of data associated with known malicious content. For example, the content is searched for malware, viruses or both. Alternatively or additionally, the content is searched for instructions that indicate known or unknown malicious code (e.g., searching for commands not expected in the type of content). Deep packet or other inspection may be performed.

In the embodiment of FIG. 1, a firewall 19 is co-located (e.g., same rack, room, building, or complex) with the TURN server 18. The firewall 19 inspects the relayed traffic and blocks malicious content. For inspection, the firewall 19 is PPSP aware. In alternative embodiments, the firewall 19 is not co-located with the TURN server 18. The TURN server 18 transmits the content to the firewall 19 as a client and the firewall 19 returns results of the inspection as a server. In yet other alternative embodiments, the content is routed to a server for inspection. The TURN server 18 or a different server performs the inspection. The server inspects content of the P2P network without or with additional routing to the TURN server 18.

The inspection is performed for the P2P network by the provider of the network. For example, the Internet service provider provides the inspection. In other embodiments, the inspection is performed as part of security-as-a-service. A third party provides the instructions for the firewall 19 or provides the firewall 19 (or server) for inspecting. In yet another alternative, the security-as-a-service function and corresponding device (e.g., firewall 19 or server) may operate as a peer itself, which accelerates how quickly the inspecting device may provide a verdict (e.g., "malware"/ "ok") about the file.

In act 54, the content is handled according to the results of the inspection. Where malicious content is found in the content from the end-point device 14, then the content is blocked. The content is not forwarded to the requesting end-point device 20 or devices. Alternatively, the malicious code is removed and the sanitized content is transmitted to the requesting end-point device 20 or devices.

If no malicious code is found, then the content is transmitted to the requesting end-point device 20 or devices. The TURN server 18 or the inspecting device (e.g., firewall 19) allows the data to pass on to the requesting peer. Thus, peers receive inspected content, free from any infections, in act 56.

In act 58, the results of the inspection are communicated. The TURN server 18, firewall 19, or other inspecting device communicates the results of the inspection to the tracker computer 16 and/or the source end-point device 14. The results are that the content is infected or that the content is free of malicious code. Other information than the results may additionally be communicated, such as the malicious code sought, malicious code found, type of inspection, or time stamp information.

In one embodiment, the detection of malicious code or lack of malicious code is indicated to the tracking computer 16. The inspecting device (e.g., firewall 19 or TURN server 18) and the tracker computer establish a secure communication channel, such as using hypertext transfer protocol secure (HTTPS) communications. Key-based systems or other encryption verification for secure communications may be used. To exchange information, a publish-subscribe mechanism is used. Alternatively, a push, pull, or messaging mechanism is used.

In act 60, the tracking computer 16 tracks inspection of the content. The tracker computer 16, in addition to keeping track of peers that can serve content, also tracks content that has been inspected for malicious content. The results are recorded in the peer list or other database. The end-point device 14 and/or a specific content of the end-point device 14 are flagged as having or not having malicious content. In alternative embodiments, other recording or tracking of the results is performed.

In act 62, further serving of the content with malicious code by the end-point device 14 is prevented. Where the communication is of the detection of malicious code, this detection is communicated to the tracker computer 16. Transmission of the content from the peer to other peers is prevented by the tracker computer 16. The communication is used by the TURN server 18 or other inspecting device to prevent further transmission of content to peers. The communication to the tracker computer 16 is used to prevent subsequent serving of the content with the malicious code.

The tracker computer 16 may use any mechanism to prevent subsequent serving of the content. In one embodiment, the advertising by the tracker computer 16 of the availability of the content ceases. If the firewall 19 detects that the content is infected, then the tracker computer 16 no longer advertises the content, so that malicious content will no longer be served to peers. Alternatively, any advertising by the end-point device 14 of the content is prevented. In an alternative or additional approach, the tracker computer 16 does not forward requests for the content or responds that the content is not available to any requesting peers.

In act 64, the previously inspected content is routed to any requesting peers. For example, the end-point device 20 again requests the content in act 66. Alternatively, one or more other peers request the content. Rather than replacing the addresses in the peer list as performed in act 42, the tracker computer 16 provides the addresses of the content providing peer. Where the firewall 19 announces to the tracker computer 16 that the content is inspected and free from any malicious content, the tracker computer 16 replaces the addresses for routing to the TURN server 18 or other inspecting device with the originally advertised addresses of the end-point device 14. The tracker computer 16 internally updates the content status to "safe" and no longer replaces the addresses advertised by the end-point device 14 in the peer list. All subsequent requests for this content from peers in the swarm may be directly served by the end-point device 14 itself with or without having to go through the TURN server 18 or other inspection device. In act 68, the end-point device 14 serves the content to the requesting end-point device 20. Alternatively, the content continues to be routed through the TURN server 18, but inspection is not performed.

The tracker computer 16 or the receiving end-point device 20 may check the content for alteration to avoid post-inspection introduction of malicious content. Serving polluted content (e.g., decoy or infected content) is avoided using verification. Any integrity verification scheme may be used, such as hashing. Alternatively, the end-point device 14 is trusted and further checks are not performed. In yet other alternatives, the content is always inspected, and the tracker computer 16 does not track the results of inspection.

Figure 3:
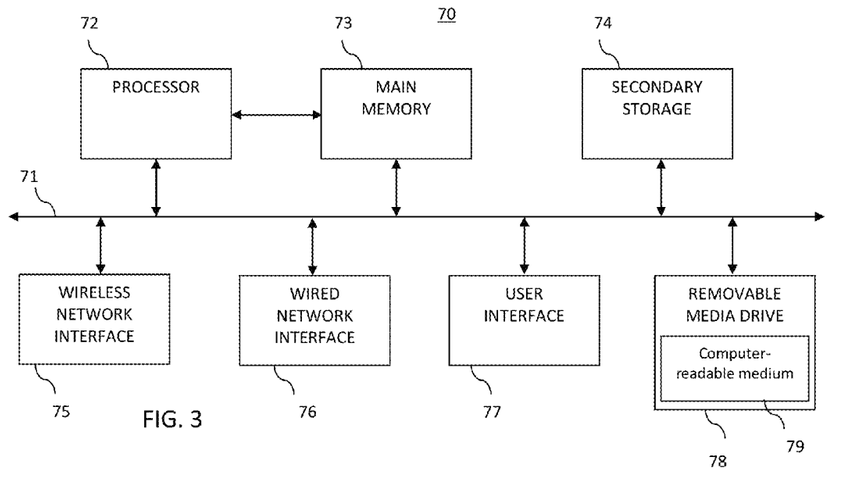
FIG. 3 is a block diagram of a network device, according to one embodiment, for inspecting content in P2P streaming.

FIG. 3 shows one embodiment of an apparatus for inspecting content in P2P. The apparatus is shown as a simplified block diagram of an example network device, such as the end-point device 14, tracker computer 16, TURN server 18, firewall 19 or other inspection device, or end-point device 20 of FIG. 1. In FIG. 3, the example network apparatus or device 70 corresponds to network elements or computing devices that may be deployed in the P2P network. The network device 70 includes software and/or hardware to perform any one or more of the activities or operations for inspecting content in P2P or interacting in the P2P architecture to provide for content inspection.

The network device 70 includes a processor 72, a main memory 73, secondary storage 74, a wireless network interface 75, a wired network interface 76, a user interface 77, and a removable media drive 78 including a computer-readable medium 79. A bus 71, such as a system bus and a memory bus, may provide electronic communication between processor 72 and the other components, memory, drives, and interfaces of network device 70.

Additional, different, or fewer components may be provided. The components are intended for illustrative purposes and are not meant to imply architectural limitations of network devices 14, 16, 18, 19, or 20. For example, the network device 70 may include another processor and/or not include the secondary storage 74 or removable media drive 78. Each network device 14, 16, 18, 19, or 20 may include more or less components than other network devices 14, 16, 18, 19, or 20.

The processor 72, which may also be referred to as a central processing unit (CPU), is any general or special-purpose processor capable of executing machine readable instructions and performing operations on data as instructed by the machine readable instructions. The main memory 73 may be directly accessible to processor 72 for accessing machine instructions and may be in the form of random access memory (RAM) or any type of dynamic storage (e.g., dynamic random access memory (DRAM)). The secondary storage 74 may be any non-volatile memory, such as a hard disk, which is capable of storing electronic data including executable software files. Externally stored electronic data may be provided to computer 70 through one or more removable media drives 78, which may be configured to receive any type of external media 79, such as compact discs (CDs), digital video discs (DVDs), flash drives, external hard drives, or any other external media.

The wireless and wired network interfaces 75 and 76 may be provided to enable electronic communication between the network device 70 and other network devices via one or more networks. In one example, the wireless network interface 75 includes a wireless network interface controller (WNIC) with suitable transmitting and receiving components, such as transceivers, for wirelessly communicating within the network 10. The wired network interface 76 may enable the network device 70 to physically connect to the network 10 by a wire, such as an Ethernet cable. Both wireless and wired network interfaces 75 and 76 may be configured to facilitate communications using suitable communication protocols, such as the Internet Protocol Suite (TCP/IP).

The network device 70 is shown with both wireless and wired network interfaces 75 and 76 for illustrative purposes only. While one or both wireless and hardwire interfaces may be provided in the network device 70, or externally connected to network device 70, only one connection option is needed to enable connection of network device 70 to the P2P network. The network device 70 may include any number of ports using any type of connection option.

A user interface 77 may be provided in none, some or all machines to allow a user to interact with the network device 70. The user interface 77 includes a display device (e.g., plasma display panel (PDP), a liquid crystal display (LCD), or a cathode ray tube (CRT)). In addition, any appropriate input device may also be included, such as a keyboard, a touch screen, a mouse, a trackball, microphone (e.g., input for voice recognition), buttons, and/or touch pad.

Instructions embodying the activities or functions described herein may be stored on one or more external computer-readable media 79, in main memory 73, in the secondary storage 74, or in the cache memory of processor 72 of the network device 70. These memory elements of network device 70 are non-transitory computer-readable media. The logic for implementing the processes, methods and/or techniques discussed herein are provided on non-transitory computer-readable storage media or memories, such as a cache, buffer, RAM, removable media, hard drive or other computer readable storage media. Computer readable storage media include various types of volatile and nonvolatile storage media. Thus, 'computer-readable medium' is meant to include any medium that is capable of storing instructions for execution by network device 70 that cause the machine to perform any one or more of the activities disclosed herein.

The instructions stored on the memory as logic may be executed by the processor 72. The functions, acts or tasks illustrated in the figures or described herein are executed in response to one or more sets of instructions stored in or on computer readable storage media. The functions, acts or tasks are independent of the particular type of instructions set, storage media, processor or processing strategy and may be performed by software, hardware, integrated circuits, firmware, micro code and the like, operating alone or in combination. Likewise, processing strategies may include multiprocessing, multitasking, parallel processing and the like.

The memory, such as the external computer-readable media 79, main memory 73, the secondary storage 74, or the cache memory of processor 72, alternatively or additionally stores data. For example, the main memory 73 stores content to be served in the P2P network. As another example, the content received from a peer is stored. In yet another example, a peer list including addresses, content, and inspection status is stored. The peer list includes information about the content and peer serving the content for various peers of the P2P network.

Additional hardware may be coupled to the processor 72 of the network device 70. For example, memory management units (MMU), additional symmetric multiprocessing (SMP) elements, physical memory, peripheral component interconnect (PCI) bus and corresponding bridges, or small computer system interface (SCSI)/integrated drive electronics (IDE) elements. The network device 70 may include any additional suitable hardware, software, components, modules, interfaces, or objects that facilitate operation. This may be inclusive of appropriate algorithms and communication protocols that allow for the effective protection and communication of data. Furthermore, any suitable operating system is configured in network device 70 to appropriately manage the operation of the hardware components therein.

The processor 72, configured by logic or other instructions, generates messages pursuant to the P2P. As an endpoint device, the processor 72 may serve content and/or receive content through messaging with the tracker and/or TURN server. As a TURN server 18, the processor 72 may route content for inspection and stream content to peers. As a firewall or other inspection server, the processor 72 may receive content, inspect the content, then block or pass the content to a peer in the P2P network, and/or communication results of the inspection to a tracker.

As a tracker, the processor 72 is configured to update a peer address in the peer list for a peer of the P2P network in a Seeder mode. The update is to replace addresses to cause the content, when served, to pass through a firewall or other inspection server. For example, the peer address is updated by removing host and server reflexive candidates and retaining a relayed candidate. The processor 72 provides the updated peer address to another peer of the P2P network in a Leecher mode. This allows the Leecher to obtain content. The processor 72 is configured to track security inspection of content from the peer operating in the Seeder mode. The results of the security inspection from a security as a service for the P2P network are received and stored in the peer list or other database. For clean or uninfected content, the processor 72 replaces the updated peer address with an original peer address of the peer operating in the Seeder mode. By replacing the removed address information, the content from the peer may be provided directly to another peer or peers of the P2P network without routing through the TURN server or firewall for inspection.

The creation of the P2P network architecture, which would not exist without computer network technology, has resulted in a possible problem of serving malicious content to other devices. The inspection approach discussed herein provides a technology for solving this technologically created problem. Various devices configured in specific ways beyond generic processing are used to secure the content from malicious code.

While the invention has been described above by reference to various embodiments, it should be understood that many changes and modifications can be made without departing from the scope of the invention. It is therefore intended that the foregoing detailed description be regarded as illustrative rather than limiting, and that it be understood that it is the following claims, including all equivalents, that are intended to define the spirit and scope of this invention.

What is claimed is:

1. A method comprising:
receiving, at a tracker computer implementing a tracker protocol of a peer-to-peer network and from a first device in the peer-to-peer network, an indication of content available for serving, the tracker computer registering peers of the peer-to-peer network and advertising availability of information, including the content, from the registered peers;
receiving, at the tracker computer from a second device in the peer-to-peer network, a content request for the content;
routing, by the tracker computer, the content from the first device for the second device through a server; and
inspecting the content routed at the server for malicious code as the content is routed to the second device.

2. The method of claim 1 wherein receiving the content request comprises receiving the content request as a peer-to-peer streaming peer protocol request.

3. The method of claim 1 wherein routing comprises:
replacing a host address and server reflexive candidate of the first device with an address of the server in a peer list; and
communicating the address for the server to the second device.

4. The method of claim 1 wherein routing comprises routing the content through the server, the server comprising a transversal using relay network address translation (TURN) server.

5. The method of claim 4 wherein inspecting comprises inspecting with a firewall co-located with the TURN server.

6. The method of claim 1 wherein inspecting comprises inspecting by the server, the server comprising a security as a service application in the peer-to-peer network.

7. The method of claim 1 wherein inspecting comprises inspecting the content for malware, a virus or both malware and the virus.

8. The method of claim 1 further comprising:
blocking the content from the second device where malicious code is located in the content.

9. The method of claim 8 further comprising:
communicating detection of the malicious code to the tracker computer; and
ceasing, by the tracker computer, advertising of the content from the first device.

10. The method of claim 1 further comprising:
tracking, by the tracker computer, inspection of the content;
where the content has been inspected, routing the content from the first device to a third device without passing through the server.

11. Logic encoded in one or more non-transitory computer-readable media that includes code for execution and when executed by a processor is operable to perform operations comprising:
receiving data from a first peer of a peer-to-peer network at a tracker configured to coordinate sharing of content between peers of the peer-to-peer network, the data addressed to a second peer of the peer-to-peer network;
inspecting the data for malicious content;
communicating a result of the inspecting to a tracker of the peer-to-peer network; and
transmitting the data to the second peer where the malicious content is not found in the data.

12. The logic encoded in the one or more non-transitory computer-readable media of claim 11, wherein receiving the data comprises receiving the data with an address of a transversal using relay network address translation (TURN) server.

13. The logic encoded in the one or more non-transitory computer-readable media of claim 11, wherein inspecting comprises inspecting for malware and viruses.

14. The logic encoded in the one or more non-transitory computer-readable media of claim 11, wherein communicating comprises transmitting the result as free of the malicious content.

15. The logic encoded in the one or more non-transitory computer-readable media of claim 11, further comprising preventing transmission of other data to the second peer where the malicious content is found in the other data.

16. An apparatus comprising:
a memory configured to store a peer list of peers in a peer-to-peer network; and
a processor configured to perform tracker functions including maintaining the peer list, content availability of the peers, and address information for the peers, the processor configured to update a peer address in the peer list for a peer of the peer-to-peer network in a Seeder mode, the updated peer address being for a server, to provide the updated peer address to another peer of the peer-to-peer network in a Leecher mode, and to track security inspection on content from the peer operating in the Seeder mode routed through the server.

17. The apparatus of claim 16 wherein the processor is configured to replace the updated peer address with an original peer address of the peer operating in the Seeder mode such that the content from the peer is provided directly to the other peer or yet other peers of the peer-to-peer network without routing through the server where the security inspection indicates that the content is free from malicious content.

18. The apparatus of claim 16 wherein the processor is configured to update the peer address by removing a host and server reflexive candidates and retain a relayed candidate.

19. The apparatus of claim 16 wherein the processor is configured to receive results of the security inspection from a security as a service for the peer-to-peer network.

20. The apparatus of claim 16 further comprising:
a firewall configured to perform the security inspection of the content as routed through the server.

* * * * *